United States Patent
Park (10) Patent No.: US 8,743,550 B2
(45) Date of Patent: Jun. 3, 2014

(54) INTERFACE DEVICE FOR ELECTRONIC EQUIPMENT AND ELECTRONIC EQUIPMENT INCLUDING THE SAME

(75) Inventor: Kwang-chul Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 241 days.

(21) Appl. No.: 13/137,795

(22) Filed: Sep. 13, 2011

(65) Prior Publication Data

US 2012/0140422 A1 Jun. 7, 2012

(30) Foreign Application Priority Data

Dec. 6, 2010 (KR) ........................ 10-2010-0123496

(51) Int. Cl.
*H05K 7/16* (2006.01)
*H05K 5/00* (2006.01)
*H05K 7/00* (2006.01)
*G06F 1/16* (2006.01)

(52) U.S. Cl.
USPC .................... 361/727; 361/679.39; 361/679.4

(58) Field of Classification Search
USPC ............. 361/679.01, 679.33, 679.02, 679.28, 361/679.31, 679.32, 679.37, 679.38, 361/679.39, 679.4, 684, 725, 727, 730, 361/724; 439/39, 40, 136, 137, 138; 312/223.1, 223.2
See application file for complete search history.

(56) References Cited

U.S. PATENT DOCUMENTS

| | | | | |
|---|---|---|---|---|
| 5,738,536 A | * | 4/1998 | Ohgami et al. | 439/142 |
| 6,068,496 A | * | 5/2000 | Penate | 439/140 |
| 2008/0289257 A1 | * | 11/2008 | Xu et al. | 49/388 |
| 2009/0174993 A1 | * | 7/2009 | Lin | 361/679.02 |
| 2009/0176391 A1 | * | 7/2009 | Brock et al. | 439/136 |
| 2009/0267677 A1 | * | 10/2009 | Myers et al. | 327/356 |
| 2010/0156255 A1 | * | 6/2010 | Cheng et al. | 312/223.2 |
| 2011/0096483 A1 | * | 4/2011 | Sapper et al. | 361/679.02 |

* cited by examiner

*Primary Examiner* — Jenny L Wagner
*Assistant Examiner* — Ahmad D Barnes
(74) *Attorney, Agent, or Firm* — Staas & Halsey LLP (57) ABSTRACT

An interface device for electronic equipment including at least one port electronically connected to an external device; a housing disposed in the electronic equipment and includes an opening through which the port is drawn in and out; a door which accommodates the port and performs a first motion and a second motion, the first motion being rotation between an open position, in which the opening of the housing is open, and a close position, in which the opening is closed, the second motion being sliding between the open position and a projecting position, in which the door projects from the open position in a transverse direction to a rotation axis of the first motion parallel with an installation surface of the electronic equipment; and a driving unit which provides driving force to the door in the close position of the first motion of the door and in the second motion.

16 Claims, 13 Drawing Sheets

INTERFACE DEVICE FOR ELECTRONIC EQUIPMENT AND ELECTRONIC EQUIPMENT INCLUDING THE SAME

CROSS-REFERENCE TO RELATED APPLICATIONS

This application claims priority from Korean Patent Application No. 10-2010-0123496, filed on Dec. 6, 2010 in the Korean Intellectual Property Office, the disclosure of which is incorporated herein by reference.

BACKGROUND

1. Field

Apparatuses consistent with the exemplary embodiments relate to an interface device for electronic equipment and an electronic equipment including the same, and more particularly, to an interface device for electronic equipment which is provided in the electronic equipment to electrically connect the electronic equipment to an external device, and an electronic equipment including the same.

2. Description of the Related Art

Generally, an electronic equipment includes an image display apparatus, such as a TV, a computer, such as a notebook, home appliances, such as a washing machine, or the like. In addition to the above illustrative examples, the electronic equipment may further include various types of equipment.

Among the electronic equipment, the image display apparatus is connected to an external device to display various images. For example, the external device may be configured as a digital versatile disc (DVD) player, a set-top box, a universal serial bus (USB) memory or an external hard disc drive (HDD) to store image data, or the like. Further, the computer is electrically connected to an external device, such as a USB memory or an external HDD to store documents of a user or data including pictures.

The electronic equipment includes at least one port to be electrically connected to an external device, such as a DVD player, a set-top box, a USB memory, or an external HDD. Here, the port of the electronic equipment may be various types of ports based on international standards, for example, a USB port and a high-definition multimedia interface (HDMI) port.

Conventionally, the port is exposed outside the electronic equipment to be vulnerable to dust or foreign materials in the outside. Further, the conventional port of the electronic equipment is exposed at the same height as an external plate of the electronic equipment, which causes inconvenience when connected to the external device.

SUMMARY

Accordingly, one or more exemplary embodiments provide an interface device for electronic equipment which has an improved structure to prevent infiltration of outside dust and foreign materials and to ease connection to an external device, and an electronic equipment including the same.

The foregoing and/or other aspects may be achieved by providing an interface device for electronic equipment including: at least one port which is electronically connected to an external device; a housing which is disposed in the electronic equipment and includes an opening through which the port is drawn in and out; a door which accommodates the port and performs a first motion and a second motion, the first motion being rotation between an open position, in which the opening of the housing is open, and a close position, in which the opening is closed, and the second motion being sliding between the open position and a projecting position, in which the door projects from the open position in a transverse direction to a rotation axis of the first motion parallel with an installation surface of the electronic equipment; and a driving unit which provides driving force to the door in the close position of the first motion of the door and in the second motion.

The driving force provided by the driving unit to the door may be elasticity.

The driving unit may include: at least one elastic member which is disposed between the housing and the door and provides the elasticity in a transverse direction in which the door projects with respect to the rotation axis of the first motion; and a guide unit which is disposed between the housing and the door and guides the door to slide so that the door slides in the second motion based on the elasticity of the elastic member.

The driving unit may provide the elasticity to the door in the close position of the first motion in a direction in which the housing is in contact with the door so that the housing and the door are maintained closed.

The driving unit may provide the elasticity so that the door slides from the open position of the first motion to the projecting position of the second motion.

The first motion and the second motion of the door may be consecutively performed.

The door may include: a door body which accommodates the port and reciprocates in the first motion and the second motion; and a pair of sliding hinges which is disposed on opposite lateral sides of the door body to engage with the housing, rotates in the first motion, and slides in the second motion.

Opposite lateral sides of the housing may accommodate the sliding hinges and be formed with a guide slit to guide reciprocation in the first motion and the second motion.

The guide slit may include: a first guide slit supporting rotation of the sliding hinges so that the door rotates in the first motion; a second guide slit accommodating the sliding hinges so that the door is maintained in the projecting position in the second motion; and a third guide slit connecting the first guide slit to the second guide slit and being formed corresponding to a cross-sectional area of the sliding hinges to guide the sliding hinges to slide in the second motion and to prevent one-sided movement of the sliding hinges in the second motion.

The sliding hinges may have a rectangular cross section, and the first guide slit may be formed to have a larger cross-sectional area than the sliding hinges so that the sliding hinges rotate.

The interface device may further include a slide prevention member which is disposed on the second guide slit so that the sliding hinges prevents sliding from the projecting position of the second motion to the open position.

The slide prevention member may include a flat spring and provide elasticity in a transverse direction to a sliding direction of the sliding hinges.

The interface device may further include a cover which is disposed on the door and covers the port accommodated in the door.

The door and the cover may be formed in a single body.

The forgoing and other aspects may be achieved by providing an electronic equipment including: a main part; and an interface device according to the above configuration, the interface device being disposed in the main part and electrically connecting the main part to an external device.

As described above, according to exemplary embodiments, a driving unit is formed to provide driving force in order to perform a first motion and a second motion, thereby protecting a port from outside foreign materials and improving facilitation connection to an external device, the first motion being rotation between a close position in which a door accommodating the port is disposed in a main part and a open position in which the door is exposed outside the main part, and the second motion being sliding between the open position and a projecting position in which the door projects along an installation surface of the main part.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Hereinafter, an interface device for electronic equipment and an electronic equipment including the same according to the exemplary embodiments are described with reference to the accompanying drawings.

In the exemplary embodiments, a portable computer, particularly a notebook PC, is illustrated as an example of the electronic equipment.

Here, although the notebook PC is mentioned as an example of the electronic equipment in the exemplary embodiments, the embodiments may be also applicable to an image display device, such as a TV, or home appliances, such as, an oven.

Here, in FIGS. 1 to 13 illustrating the electronic equipment according to the exemplary embodiments, an x-axis, a y-axis, and a z-axis are shown. The x-axis denotes a direction in which a door slides from an open position to a projecting position with respect to a main part, the y-axis denotes a vector direction in which the door rotates between the open position and a close position, and the z-axis denotes a rotation axis direction in which the door rotates between the open position and the close position.

In the following description, a first motion of the door denotes rotation of the door between the close position and the open position, and a second motion of the door denotes sliding of the door between the open position and the projecting position.

Figure 1:
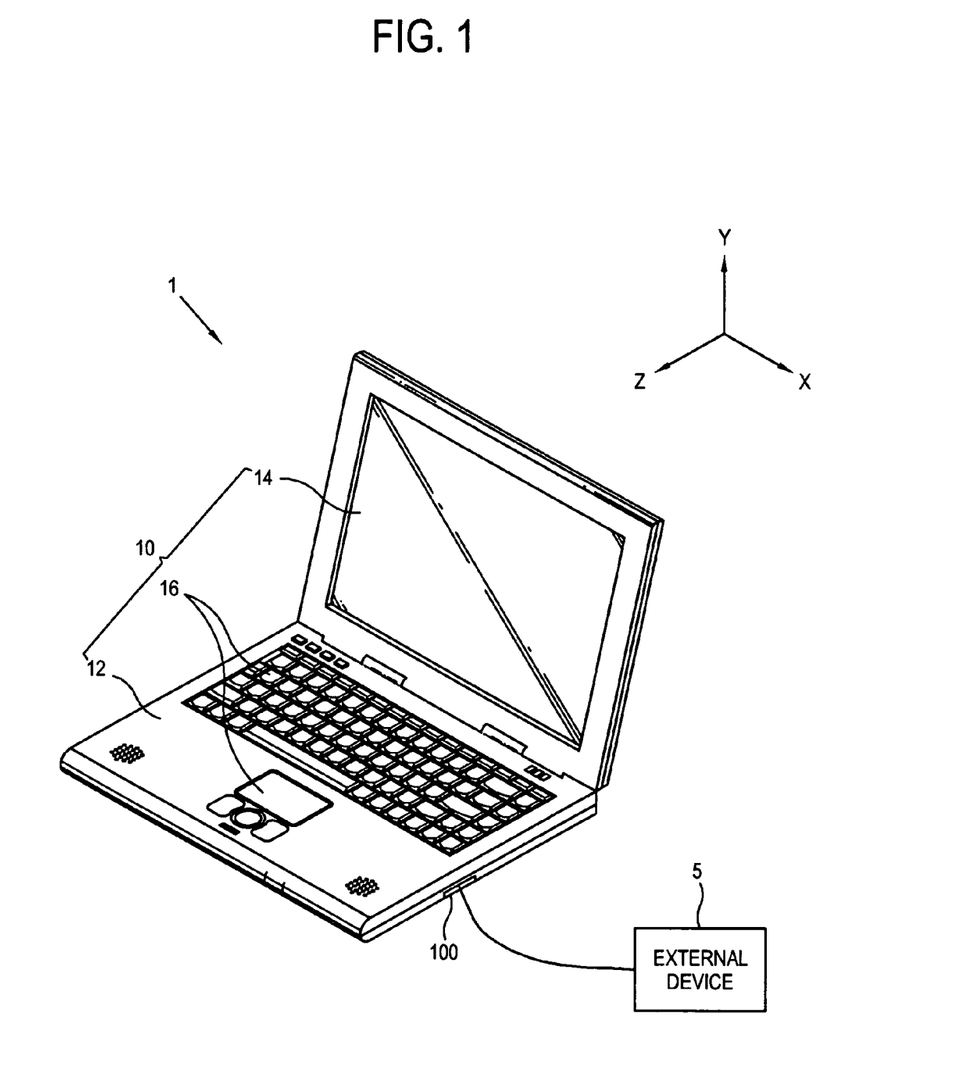
FIG. 1 is a perspective view of an electronic equipment according to a first exemplary embodiment.
Figure 2:
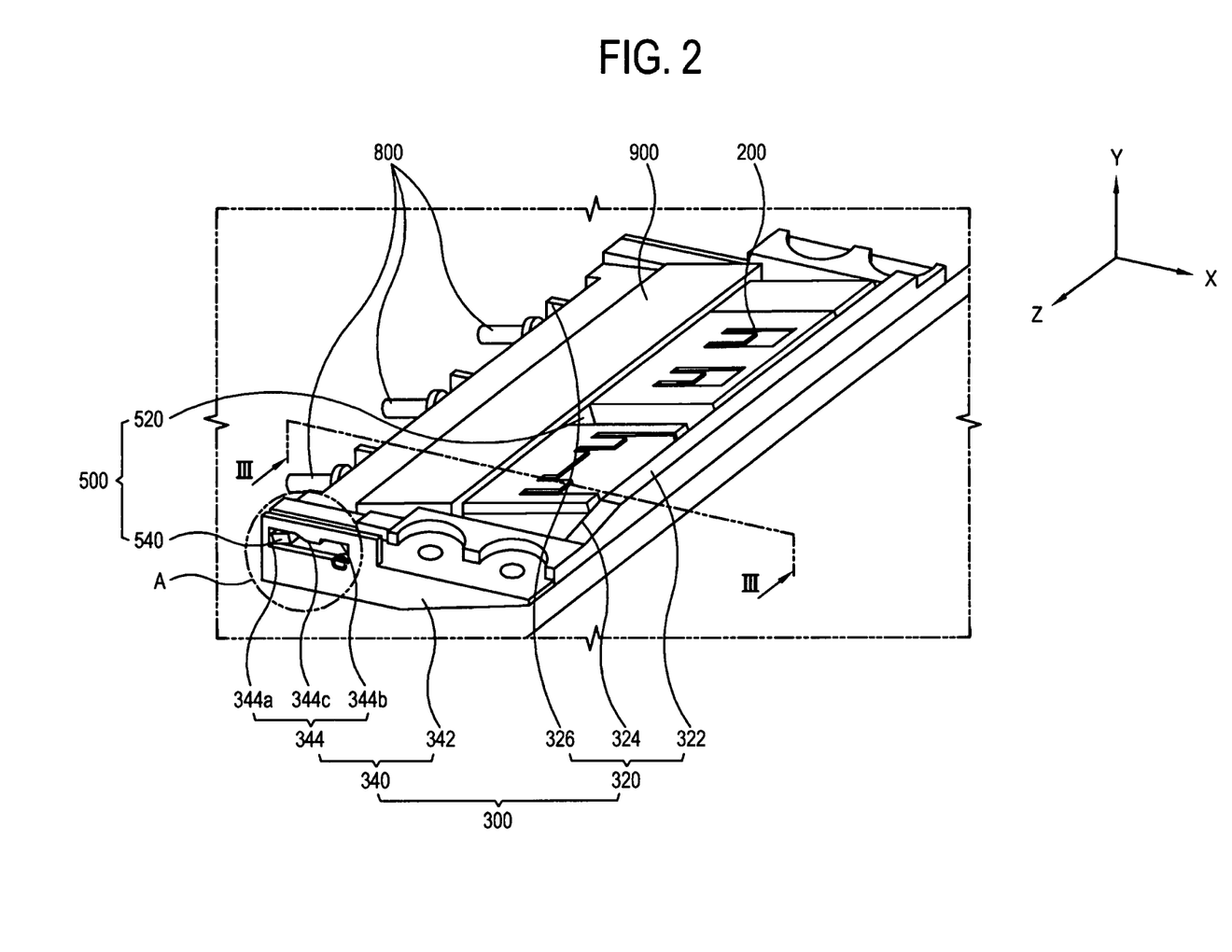
FIG. 2 is a perspective view illustrating a first state of an interface device for the electronic equipment of FIG. 1.
Figure 3:
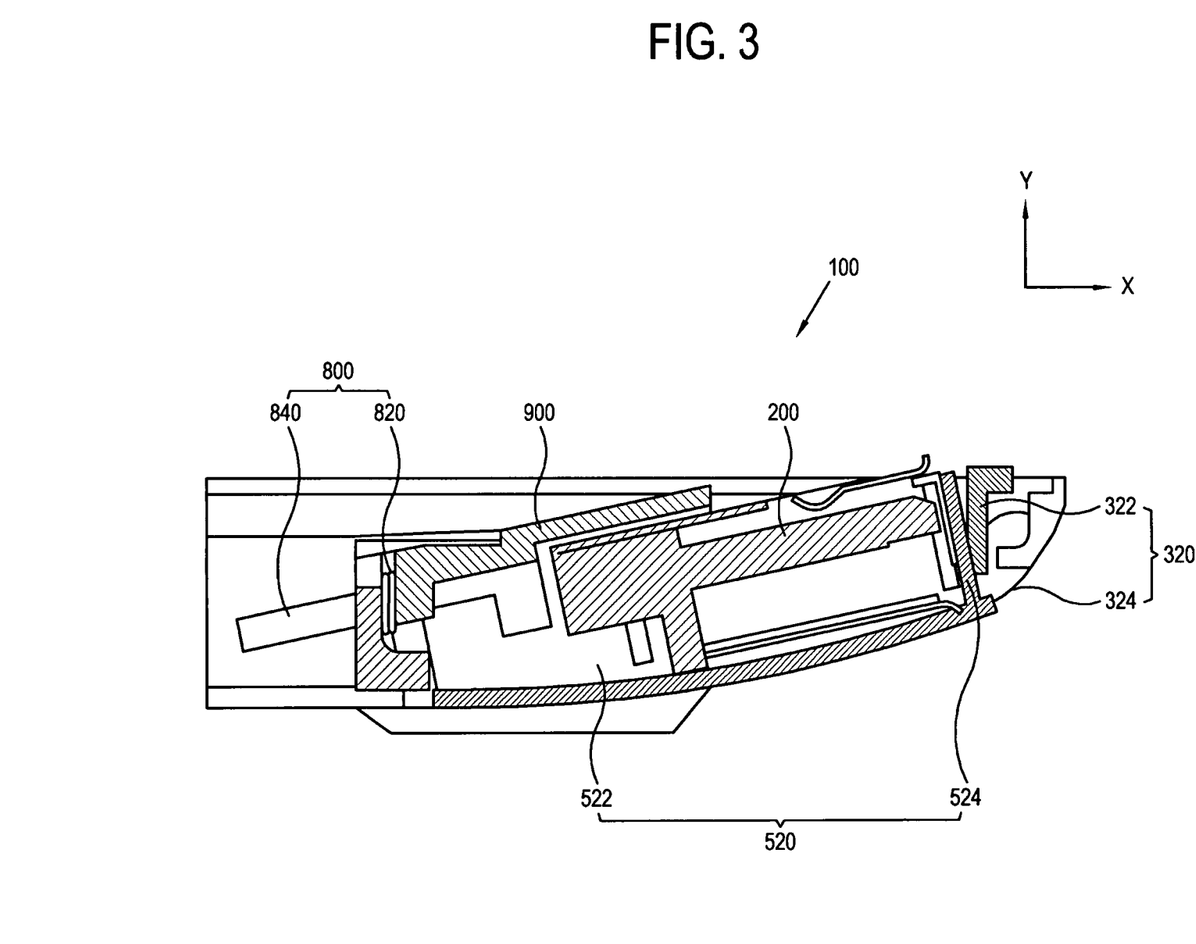
FIG. 3 is a cross-sectional view taken along line II-II of FIG. 2.
Figure 4:
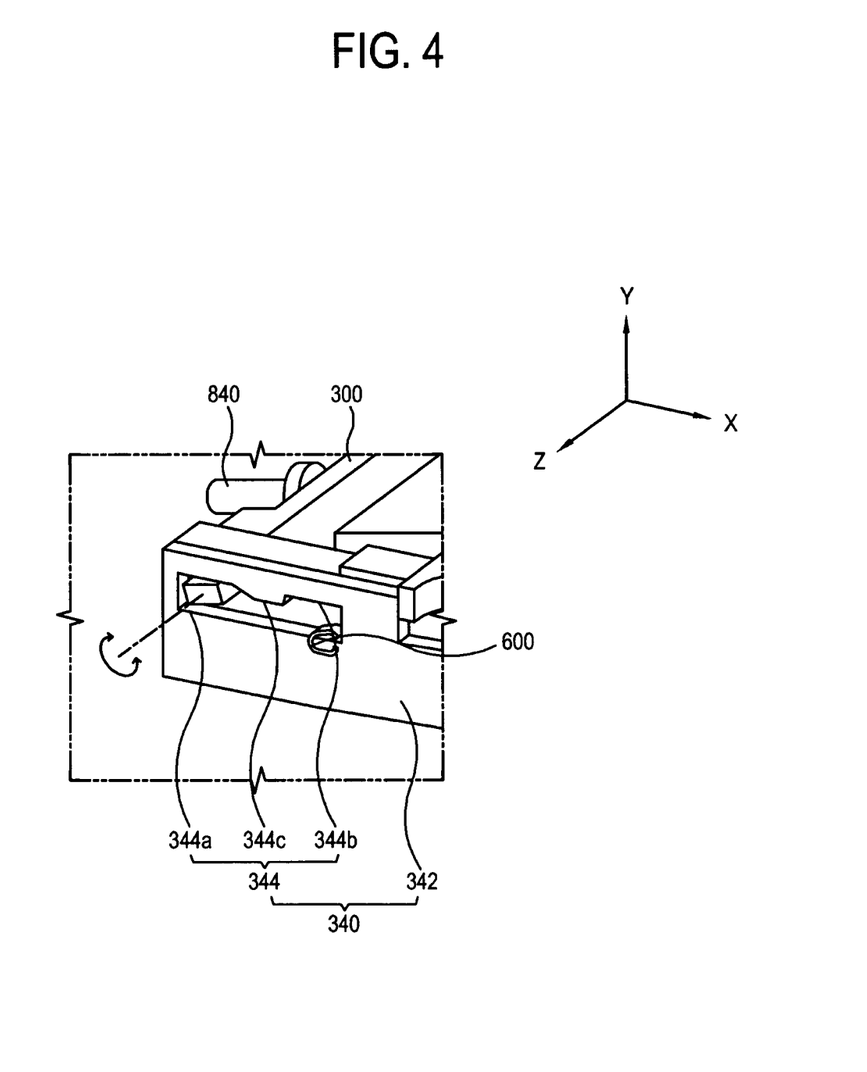
FIG. 4 is a perspective view illustrating an area A of the interface device for the electronic equipment of FIG. 2.

FIG. 1 is a perspective view of an electronic equipment according to an exemplary embodiment, FIG. 2 is a perspective view illustrating a first state of an interface device for the electronic equipment of FIG. 1, FIG. 3 is a cross-sectional view taken along line II-II of FIG. 2, and FIG. 4 is a perspective view illustrating an area A of the interface device for the electronic equipment of FIG. 2.

As shown in FIGS. 1 to 4, the electronic equipment 1 according the present embodiment includes a main part 10 and the interface device 100.

The main part 10 includes a body 12, a display unit 14 and an input unit 16. The body 12 accommodates electronic components to perform operations, such as a CPU (not shown), a memory (not shown), a graphic card (not shown), and a sound card (not shown). The display unit 14 displays results of operations of the components accommodated in the body 12. For example, the display unit 14 displays images, such as videos or the like. The input unit 16 includes a keyboard to enable input of numbers, symbols and letters, and a mouse to enable input of instructions via click or drag.

Here, the main part 10 is electrically connected to an external device 5. The external device 5 connected to the main part 10 includes a storage medium to store data, such as a universal serial bus (USB) memory and an external hard disk drive (HDD). In addition to the USB memory and the external HDD, the external device 5 may further use various known devices, such as a CD ROM drive.

The interface device 100 includes a port 200, a housing 300, a door 500, a slide prevention member 600, and a driving unit 800. The interface device 100 electrically connects the main part 10 and the external device 5 so that the main part 10 and the external device 5 configured as various types may perform two-way communication with each other.

The port 200 is provided to electrically connect the main part 10 to the external device 5. At least one port 200 is disposed to be electrically connected to at least one external device 5. In an exemplary embodiment, two ports 200 are provided. The ports 200 may be configured as USB ports to be connected to the external device 5 using a USB connector or HDMI ports to be connected to an HDMI cable. Further, the ports 200 may also be formed of a USB port and an HDMI port.

In the present embodiment, the ports 200 may be accommodated in the door 500 to be accommodated in the main part 10 or to be exposed outside the main part 10. When the ports 200 are accommodated in the main part 10, infiltration of foreign materials from the outside may be prevented. When the ports 200 are exposed outside the main part 10, electrical connection to the external device 5 may be facilitated.

Figure 5:
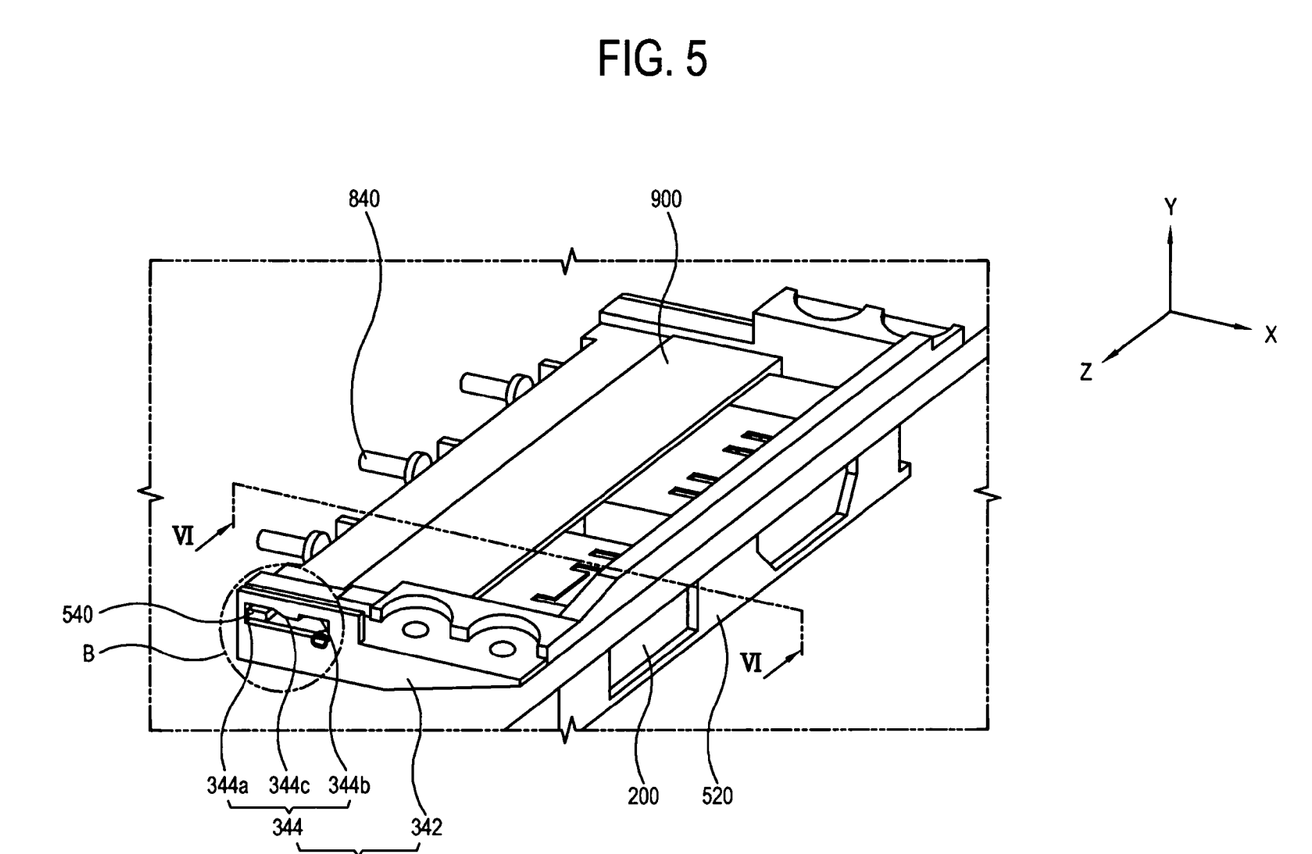
FIG. 5 is a perspective view illustrating a second state of the interface device for the electronic equipment of FIG. 1.
Figure 6:
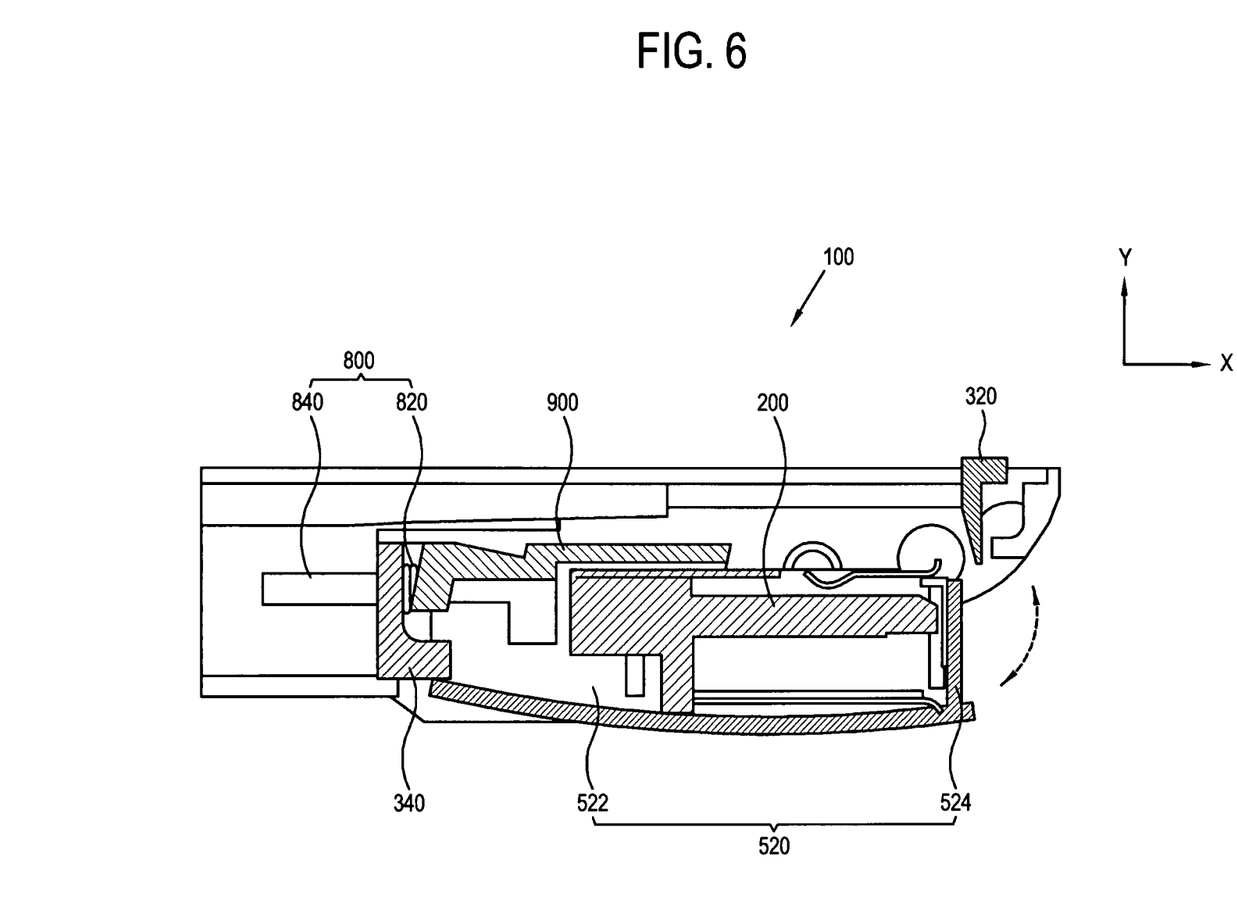
FIG. 6 is a cross-sectional view taken along line VI-VI of FIG. 5.
Figure 7:
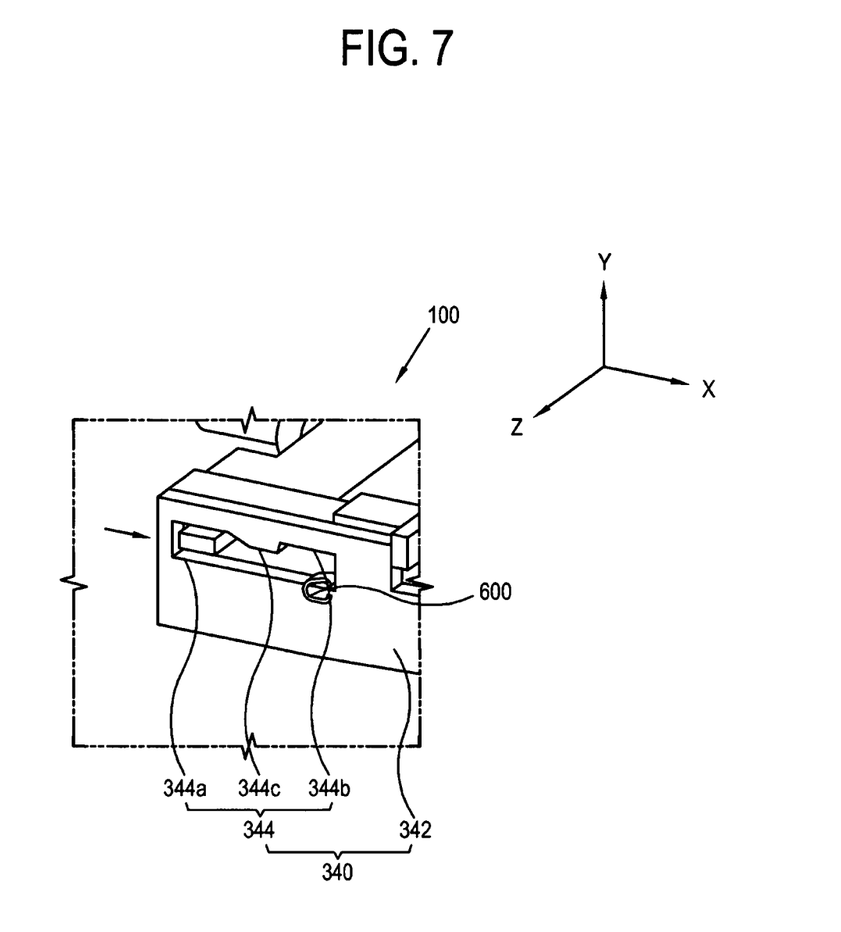
FIG. 7 is a perspective view illustrating an area B of the interface device for the electronic equipment of FIG. 5.
Figure 8:
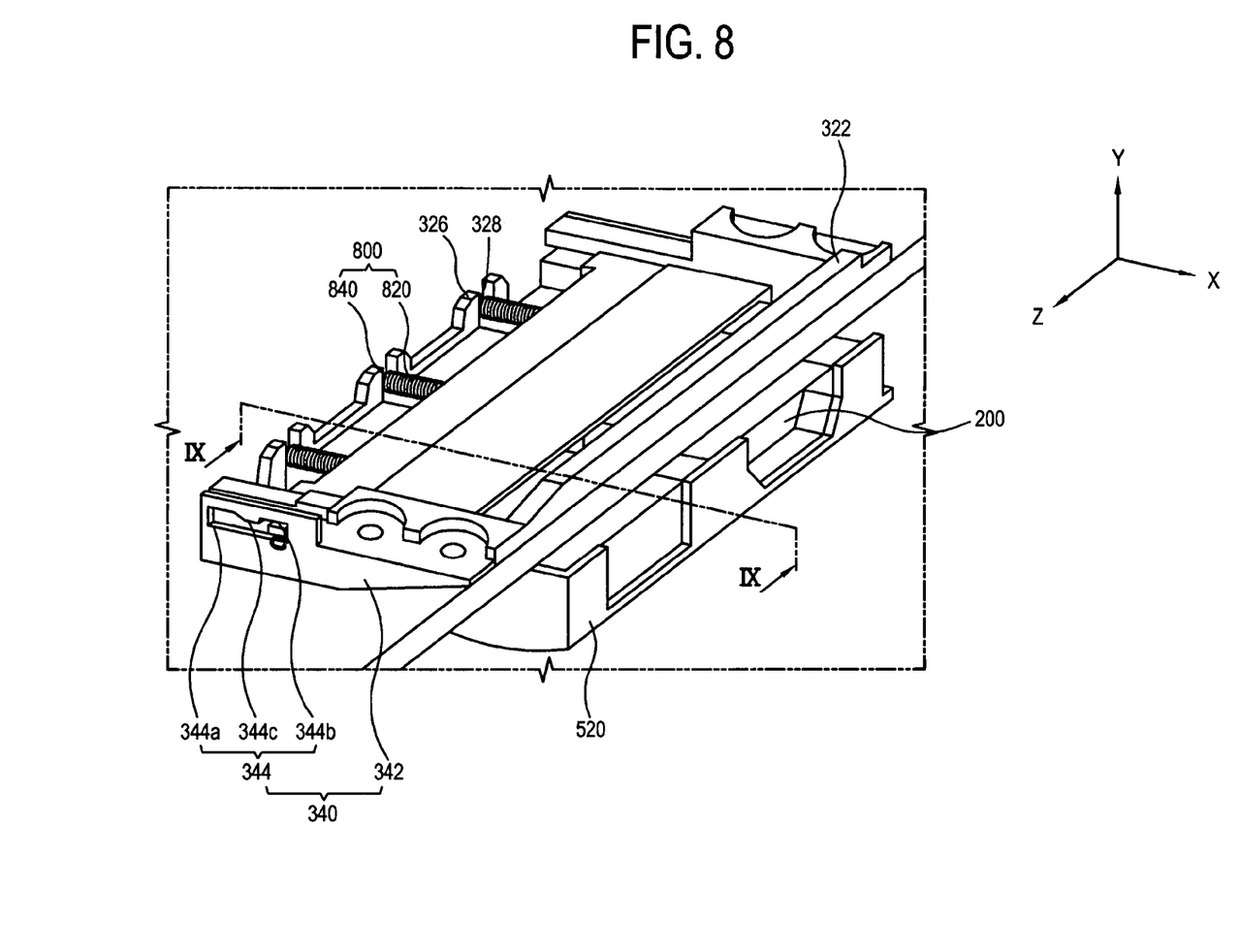
FIG. 8 is a perspective view illustrating a third state of the interface device for the electronic equipment of FIG. 2.
Figure 9:
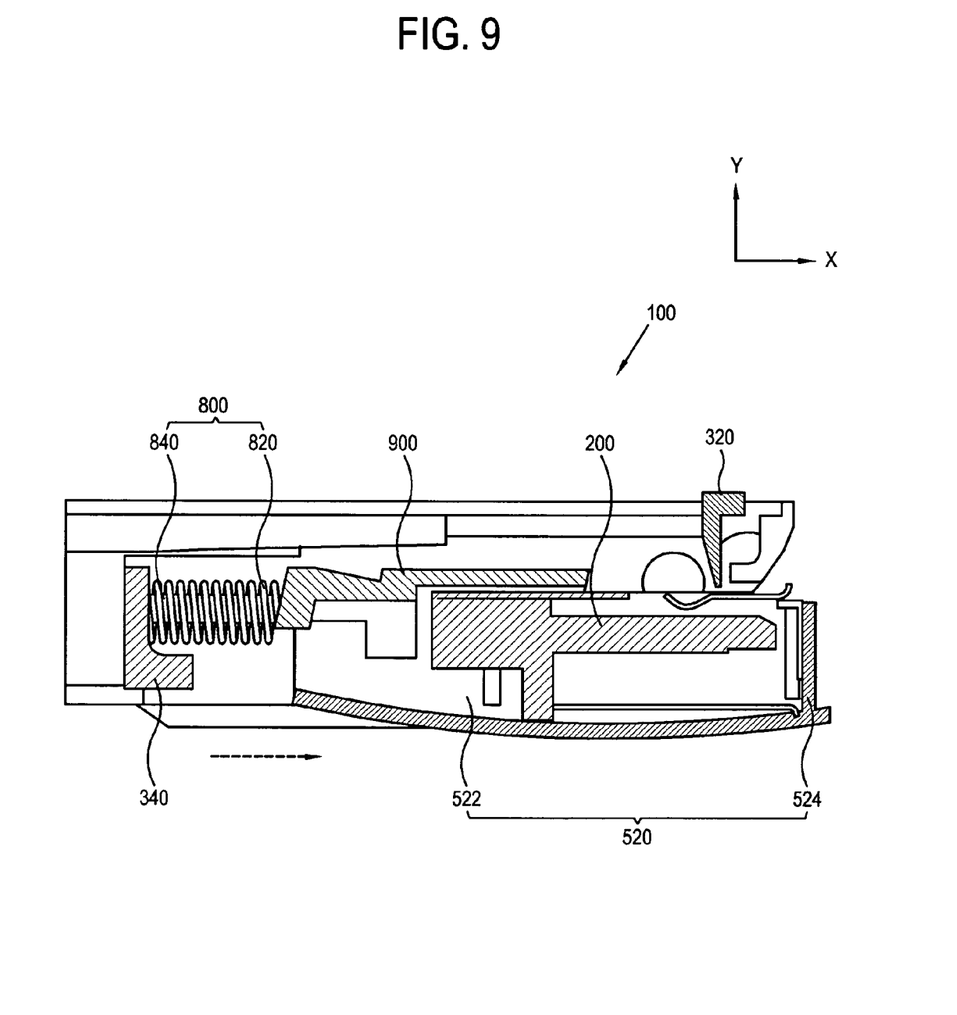
FIG. 9 is a cross-sectional view taken along line IX-IX of FIG. 8.

FIG. 5 is a perspective view illustrating a second state of the interface device for the electronic equipment of FIG. 1, FIG. 6 is a cross-sectional view taken along line VI-VI of FIG. 5, FIG. 7 is a perspective view illustrating an area B of the interface device for the electronic equipment of FIG. 5, FIG. 8 is a perspective view illustrating a third state of the interface device for the electronic equipment of FIG. 2, and FIG. 9 is a cross-sectional view taken along line IX-IX of FIG. 8.

As shown in FIGS. 5 to 9, the housing 300 is provided with an opening 324 in a portion of the main part 10 so that the port 200 is drawn in and out of the main part 10. In an exemplary embodiment, the housing 300 is disposed on a lateral side of the main part 10. One housing 300 is provided, but a plurality of housings 300 may be disposed in areas of the main part 10, for example, on opposite lateral sides, a front side, and a back side of the main part 10, for extension of the port 200. When the plurality of housings 300 are provided, a number of doors 500 increases corresponding to the housings 300, and accordingly a number of ports 200 accommodated in the doors 500 also increases. In an exemplary embodiment, the housing 300 includes a first housing 320 and a second housing 340.

The first housing 320 includes a first housing body 322, the opening 324, a guide body 326, and a guide groove 328. The first housing body 322 has a rectangular frame shape, is disposed in the main part 10, and forms the opening 324 so that the port 200 is drawn in and out of the main part 10. Here, the opening 324 is formed in the first housing body 322 so that the door 500 accommodating the port 200 is drawn in and out of the main part 10. A front part of the first housing body 322, that is, a front area in a direction where the door 500 projects, is in surface-contact with the door 500 in the close position of the door 500. The front part of the first housing body 322 is in surface-contact with a contact part 524 of the door 500 to maintain the door 500 closed in the close position.

The guide body 326 is formed in a rear part in an opposite side to the front part in surface-contact with the door 500. The guide body 326 is formed with the guide groove 328 to guide a guide unit 840 of the driving unit 800. That is, the guide groove 328 guides the guide unit 840 so that the door 500 slides to the projecting position of the second motion by elasticity provided by an elastic member 820 of the driving unit 800. In an exemplary embodiment, three guide grooves 328 are formed in the guide body 326 corresponding to three guide units 840.

The second housing 340 includes a second housing body 342 and a guide slit 344. A pair of second housing bodies 342 is disposed on opposite lateral sides of the first housing body 322. The second housing bodies 342 support reciprocation of the door 500 so that the door 500 performs the first motion and the second motion.

The guide slit 344 is formed in each of the second housing bodies 342 and engages with a sliding hinge 540 of the door 500. The guide slit 344 guides the door 500 to reciprocate in the first motion and the second motion. In the present embodiment, the guide slit 344 includes a first guide slit 344a, a second guide slit 344b, and a third guide slit 344c.

The first guide slit 344a supports rotation of the sliding hinge 540 to guide the door 500 rotate in the first motion. That is, the first guide slit 344a guides the door 500 to rotate so that the door 500 performs the first motion that is movement between the close position and the open position in a y-axis direction, that is, the y-axis vector direction, based on the z-axis rotation axis direction.

In an exemplary embodiment, when the sliding hinge 540 is formed with a rectangular cross section, the first guide slit 344a is formed to have a greater cross-sectional area than the sliding hinge 540 to support rotation of the sliding hinge 540.

The second guide slit 344b accommodates the sliding hinge 540 so that the door 500 is maintained in the projecting position in the second motion. Here, the slide prevention member 600 is formed on the second guide slit 344b preventing the door 500 in the projecting position from sliding to the open position. The slide prevention member 600 will be further described along with description motions of the door 500.

The third guide slit 344c connects the first guide slit 344a to the second guide slit 344b and is formed corresponding to a cross-sectional area of the sliding hinge 540 to guide the sliding hinge 540 to slide in the second motion and to prevent one-sided movement of the sliding hinge 540 in the second motion. The third guide silt 344c functions as a passage where the sliding hinge 540 positioned in the first guide slit 344a moves to the second slit 344b. The third guide slit 344c is formed to have substantially the same cross-sectional area as the sliding hinge 540 to prevent one-sided movement of the door 500 when sliding.

Figure 10:
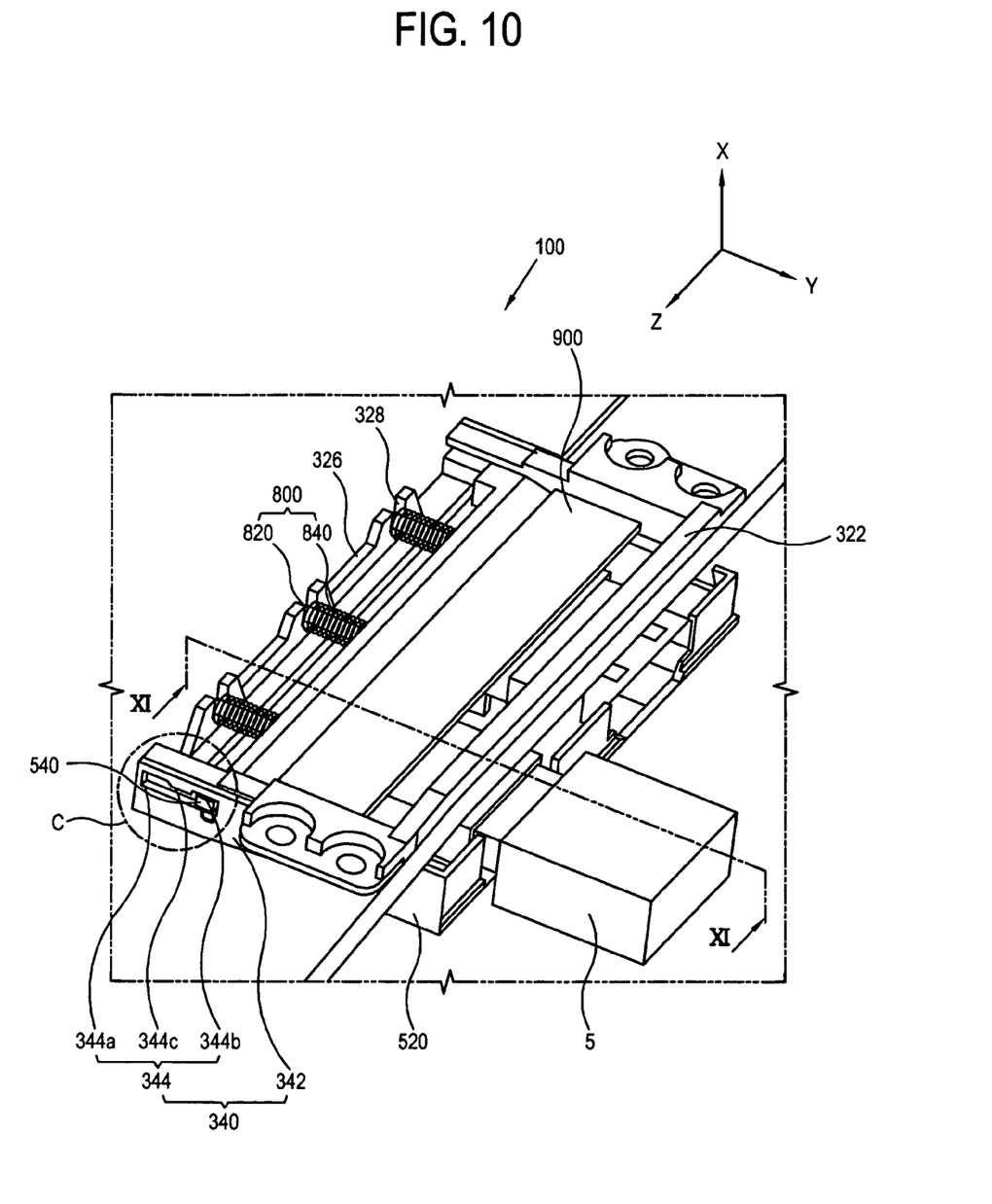
FIG. 10 is a perspective view illustrating a fourth state of the interface device for the electronic equipment of FIG. 2.
Figure 11:
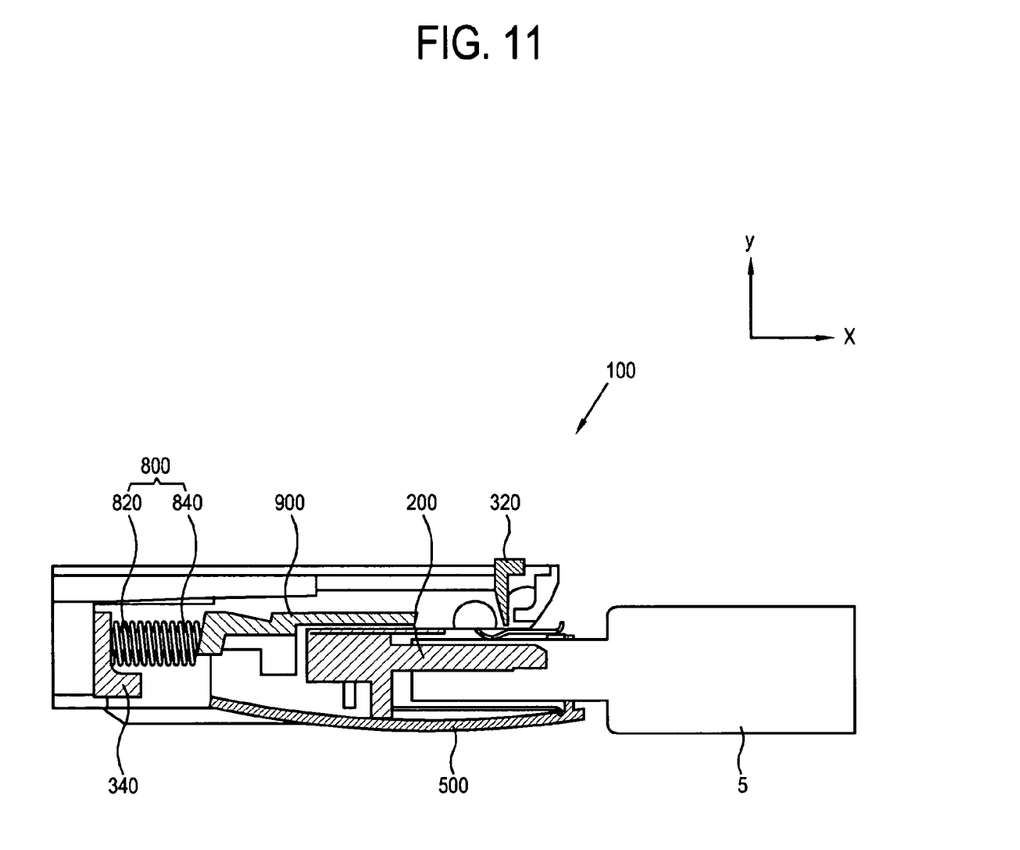
FIG. 11 is a cross-sectional view taken along line XI-XI of FIG. 10.
Figure 12:
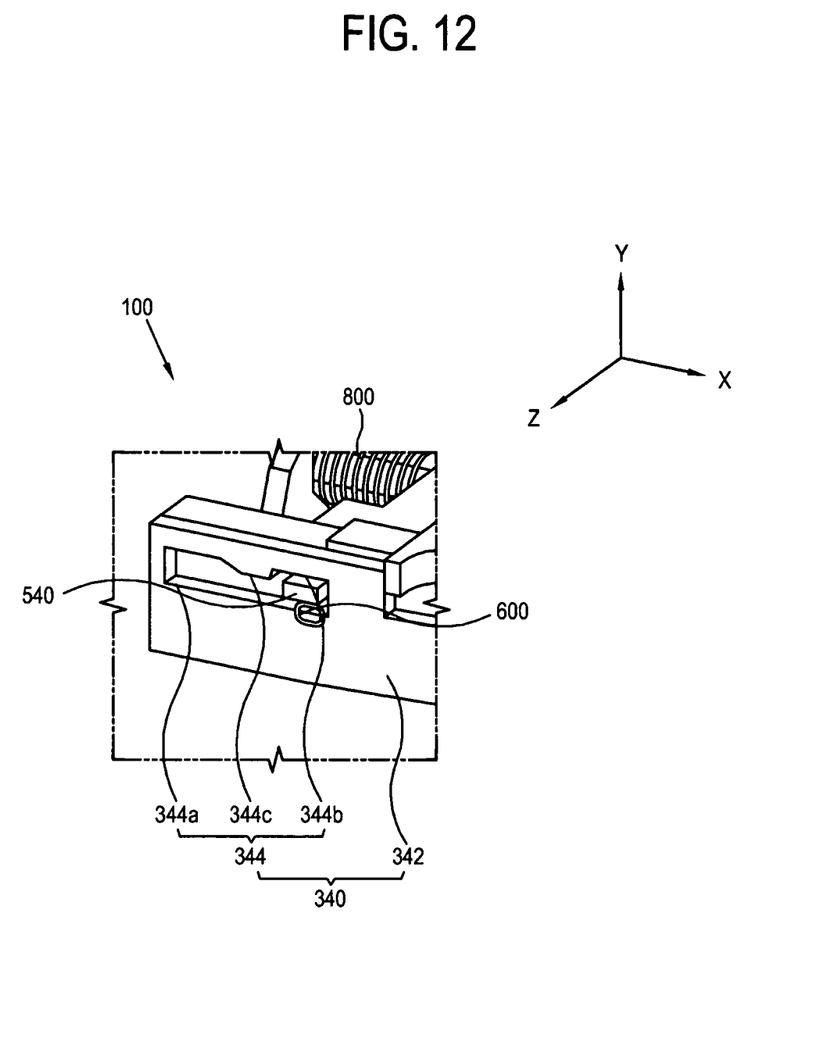
FIG. 12 is a perspective view illustrating an area C of the interface device for the electronic equipment of FIG. 10.
Figure 13:
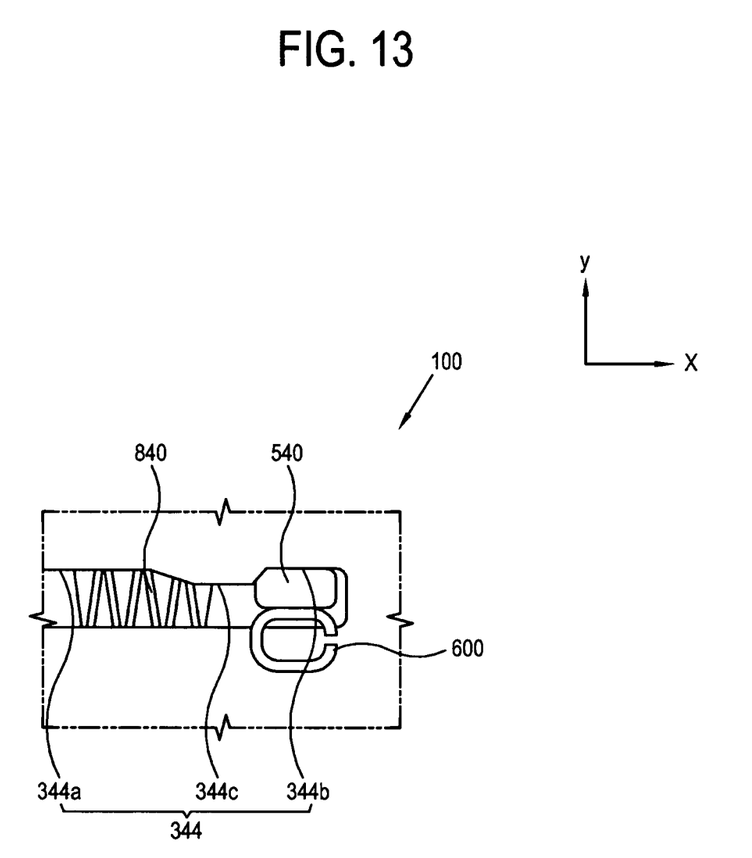
FIG. 13 is a lateral view of the area C of FIG. 12.

FIG. 10 is a perspective view illustrating a fourth state of the interface device for the electronic equipment of FIG. 2, FIG. 11 is a cross-sectional view taken along line XI-XI of FIG. 10, FIG. 12 is a perspective view illustrating an area C of the interface device for the electronic equipment of FIG. 10, and FIG. 13 is a lateral view of the area C of FIG. 12.

The door 500 accommodates the port 200 and performs the first motion and the second motion, the first motion being rotation between the open position, where the opening 324 of the first housing 320 is open, and the close position, where the opening 324 of the first housing 320 is closed, and the second motion being reciprocating sliding between the open position and the projecting position, where the door 500 projects in an x-axis direction parallel with an installation surface of the electronic equipment 1. In an exemplary embodiment, the door 500 includes the door body 520 and the sliding hinge 540.

A door body 520 accommodates the port 200 and reciprocates in the first motion and the second motion. The door body 520 includes an accommodating part 522 which is concave to accommodate the port 200, and the contact part 524 in contact with the first housing 320. Here, the contact part 524 refers to a front side in a projecting position direction among lateral sides constituting the accommodating part 522 and is in contact with an inner side of the first housing body 322. The contact part 524 is pressed to the inner side of the first housing body 322 so that the door 500 is maintained in the close position by elasticity provided by the driving unit 800.

The sliding hinge 540 allows the door body 520 to rotate based on the same rotation axis as the z-axis in the first motion. The sliding hinge 540 allows the door body 520 to slide in the x-axis direction in the second motion. In an exemplary embodiment, a pair of sliding hinges 540 is disposed on opposite lateral sides of the door body 520 to correspondingly engage with a pair of guide slits 344. That is, the sliding hinges 540 are formed to project from a surface of the opposite lateral sides of the door body 520 in the z-axis direction, corresponding to each other.

In an exemplary embodiment, the sliding hinge 540 has a rectangular cross section. Here, the first guide slit 344a supporting rotation of the sliding hinge 540 is formed to have a larger cross-sectional area than the sliding hinge 540. Alternatively, when the sliding hinge 540 has a round cross section, the first guide slit 344a has a cross section corresponding to the round cross section.

The sliding hinge 540 is accommodated in the first guide slit 344a between the open position and the close position of the door body 520 in the first motion, and rotates when the door body 520 rotates in the first motion. That is, as shown in the area A of FIG. 4, the sliding hinge 540 is accommodated in the first guide slit 344a and rotates.

Further, as shown in the area B of FIG. 7, the sliding hinge 540 slides to the third guide slit 344c, so that the door body 520 slides from the open position to the projecting position. Here, third guide slit 344c is formed to have the same cross-sectional area as the sliding hinge 540 with positive allowance to guide the sliding hinge 540 to slide and to prevent one-sided movement of the sliding hinge 540 between the first guide slit 344a and the second guide slit 344b.

Further, as shown in the area C of FIG. 12, the sliding hinge 540 is accommodated in the second guide slit 344b in the projecting position of the second motion. Here, the slide prevention member 600 is disposed on the second guide slit 344b to prevent the door body 520 from sliding from the projecting position to the open position.

The slide prevention member 600 is formed of a U-shaped flat spring concaved in the x-axis direction. The slide prevention member 600 is disposed on the second guide slit 344b to provide elasticity to the sliding hinge 540 in a transverse direction to a sliding direction of the sliding hinge 540. Due to the elasticity provided by the slide prevention member 600 to the sliding hinge 540, when the port 200 is connected to the external device 5, sliding of the door 500 from the projecting position to the open position may be prevented.

In an exemplary embodiment, the driving unit 800 includes the elastic member 820 and the guide unit 840. The driving unit 800 provides driving force to the door 500 in the close position of the first motion of the door 500 and in the second motion of the door 500. Here, the driving unit 800 provides elasticity so that the door 500 is maintained in the close position and slides in the x-axis direction from the open position to the projecting position with respect to the housing 300. The driving unit 800 provides elasticity so that the first motion and the second motion of the door 500 are consecutively performed.

In an exemplary embodiment, three elastic members 820 are used. The elastic members 820 use a coil spring. The elastic member 820 of the coil spring are a tensile spring so that the door 500 is closed in the close position and slides from the open position to the projecting position in the second motion with respect to the housing 300. The elastic members 820 are connected to the guide unit 840 and disposed between a back side of the door 500 and a back side of the first housing 320 to provide elasticity to the door 500.

The guide unit 840 is disposed between the housing 300 and the door 500 and guides the door 500 to slide so that the door 500 performs the second motion based on the elasticity of the elastic members 820. The guide unit 840 is formed to project from the back side of the door 500. The guide unit 840 is inserted into the guide groove 328 of the first housing 320. Three guide units 840 are disposed and respectively inserted into the elastic members 820 to guide the door 500 operating by the elasticity of the elastic members 820 so as not to one-sidedly move. The disposition of the three guide units 840 is just an illustrative example, and a number of guide units 840 may be changed on a design.

The electronic equipment 1 according to the present embodiment may further include a cover 900 to cover the port 200. The cover 900 is disposed on the door 500 and covers the port 200 accommodated in the door 500. That is, the cover 900 prevents infiltration of foreign materials into the port 200 when the door 500 is positioned inside or outside the main part 10. Here, the cover 900 may be formed in a single body with the door 500 or be formed separately to be connected to the door 500.

With the above configuration, a state of the interface device 100 of the electronic equipment 1 according to the present embodiment is described below.

When the interface device 100 is not electrically connected to the external device 5, the interface device 100 is accommodated in the main part 10. That is, the door 500 is positioned in the close position to cover the opening 324 of the housing 300. Here, the elastic member 820 of the driving unit 800 provides elasticity so that the door 500 is in surface-contact with the housing 300 and maintained in the close position.

To electrically connect the main part 10 to the external device 5, the first motion is performed so that the door 500 rotates from the close position to the open position. Here, the sliding hinges 540 disposed on opposite lateral sides of the door 500 rotate on the same rotation axis as the z-axis to perform the first motion of the door 500.

Then, the door 500 slides in the x-axis direction from the open position of the first motion to the projecting position, to be connected to the external device 5, by the elasticity of the driving unit 800. Here, when the port 200 is connected to the external device 5 in the projecting position, the elasticity is provided to the sliding hinges 540 so that the door 500 does not slide from the projecting position to the open position by pressure due to the connection. That is, the slide prevention member 600 disposed on the second guide slit 344b provides the elasticity in the transverse direction to the sliding direction of the sliding hinges 540 to prevent the door 500 from sliding when the external device 5 is connected to the port 200.

As described above, the door 500 accommodating the port 200 is maintained in the main part 10 by the elasticity of the driving unit 800 in the first motion, and consecutively performs the second motion that the door 500 is sliding to the projecting position outside the main part 10, thereby preventing infiltration of foreign materials into the port 200 and improving easy connection of the port to the external device 5.

Meanwhile, a motion of the door 500 from the projecting position to the close position is achieved by performing the first motion and the second motion in reverse order.

Although a few exemplary embodiments have been shown and described, it will be appreciated by those skilled in the art that changes may be made in these exemplary embodiments without departing from the principles and spirit of the invention, the scope of which is defined in the appended claims and their equivalents. For example, the above embodiments are described with a TV as an illustrative example, but the display apparatus of the embodiments may be configured as a smart phone, a mobile phone, and the like.

What is claimed is:

1. An interface device for electronic equipment comprising: at least one port which is electronically connected to an external device;
   a housing which is disposed in the electronic equipment and includes an opening through which the port is drawn in and out;
   a door which accommodates the port and performs a first motion and a second motion, the first motion being rotation between an open position, in which the opening of the housing is open, and a close position, in which the opening is closed, and the second motion being sliding between the open position and a projecting position, in which the door projects from the open position in a transverse direction to a rotation axis of the first motion parallel with an installation surface of the electronic equipment; and
   a driving unit which provides driving force to the door in the close position of the first motion and the second motion of the door,
   wherein the door is rotatably and slidably supported by the housing.

2. The interface device of claim 1, wherein the driving force provided by the driving unit to the door is elasticity.

3. The interface device of claim 2, wherein the driving unit comprises:
- at least one elastic member which is disposed between the housing and the door and provides the elasticity in a transverse direction in which the door projects with respect to the rotation axis of the first motion; and
- a guide unit which is disposed between the housing and the door and guides the door to slide so that the door slides in the second motion based on the elasticity of the elastic member.

4. The interface device of claim 2, wherein the driving unit provides the elasticity to the door in the close position of the first motion in a direction in which the housing is in contact with the door so that the housing and the door are maintained closed.

5. The interface device of claim 2, wherein the driving unit provides the elasticity so that the door slides from the open position of the first motion to the projecting position of the second motion.

6. The interface device of claim 1, wherein the first motion and the second motion of the door are consecutively performed.

7. The interface device of claim 1, wherein the door comprises:
- a door body which accommodates the port and reciprocates in the first motion and the second motion; and
- a pair of sliding hinges which is disposed on opposite lateral sides of the door body to engage with the housing, rotates in the first motion, and slides in the second motion.

8. The interface device of claim 7, wherein opposite lateral sides of the housing accommodate the sliding hinges and are formed with a guide slit to guide reciprocation in the first motion and the second motion.

9. The interface device of claim 8, wherein the guide slit comprises:
- a first guide slit supporting rotation of the sliding hinges so that the door rotates in the first motion;
- a second guide slit accommodating the sliding hinges so that the door is maintained in the projecting position in the second motion; and
- a third guide slit connecting the first guide slit to the second guide slit and being formed corresponding to a cross-sectional area of the sliding hinges to guide the sliding hinges to slide in the second motion and to prevent one-sided movement of the sliding hinges in the second motion.

10. The interface device of claim 9, wherein the sliding hinges have a rectangular cross section, and the first guide slit is formed to have a larger cross-sectional area than the sliding hinges so that the sliding hinges rotate.

11. The interface device of claim 9, wherein the sliding hinges have a round cross section, and the first guide slit is formed to have a cross section corresponding to the round cross section.

12. The interface device of claim 9, further comprising a slide prevention member which is disposed on the second guide slit so that the sliding hinges prevents sliding from the projecting position of the second motion to the open position.

13. The interface device of claim 12, wherein the slide prevention member comprises a flat spring and provides elasticity in a transverse direction to a sliding direction of the sliding hinges.

14. The interface device of claim 1, further comprising a cover which is disposed on the door and covers the port accommodated in the door.

15. The interface device of claim 14, wherein the door and the cover are formed in a single body.

16. An electronic equipment comprising:
- a main part; and
- an interface device according to claim 1, the interface device being disposed in the main part and electrically connecting the main part to an external device.

* * * * *